US010608913B2

(12) United States Patent
Lee et al.

(10) Patent No.: US 10,608,913 B2
(45) Date of Patent: Mar. 31, 2020

(54) METHODS, SYSTEMS, AND COMPUTER READABLE MEDIA FOR CONDUCTING AND VALIDATING NETWORK ROUTE CONVERGENCE TESTING (71) Applicant: Keysight Technologies Singapore (Sales) Pte. Ltd., Singapore (SG)

(72) Inventors: Dean Ding-Tang Lee, Huntington Beach, CA (US); Anton-Valentin Pandichie, Bucharest (RO); Silviu Ionut Niculescu, Bucharest (RO)

(73) Assignee: Keysight Technologies Singapore (Sales) Pte. Ltd., Singapore (SG)

( * ) Notice: Subject to any disclaimer, the term of this patent is extended or adjusted under 35 U.S.C. 154(b) by 301 days.

(21) Appl. No.: 15/640,416

(22) Filed: Jun. 30, 2017

(65) Prior Publication Data
US 2018/0375751 A1 Dec. 27, 2018

(30) Foreign Application Priority Data
Jun. 23, 2017 (RO) .................................. 2017 00418

(51) Int. Cl.
*H04L 12/26* (2006.01)
*H04L 12/741* (2013.01)
(52) U.S. Cl.
CPC .......... *H04L 43/0829* (2013.01); *H04L 43/16* (2013.01); *H04L 43/50* (2013.01); *H04L 45/74* (2013.01)
(58) Field of Classification Search
CPC ..... H04L 43/0829; H04L 43/16; H04L 43/50; H04L 45/74
See application file for complete search history.

(56) References Cited

U.S. PATENT DOCUMENTS 8,588,082 B2 11/2013 Gintis et al.
2008/0298265 A1* 12/2008 Filsfils ................ H04L 43/0852
370/252
(Continued)

OTHER PUBLICATIONS

Poretsky et al. RFC 6412. Terminology for Benchmarking Link-State IGP Data-Plane Route Convergence. (Year: 2011).*
(Continued)

*Primary Examiner* — Oussama Roudani (57) ABSTRACT

A method for testing network route convergence includes receiving input for specifying a route convergence threshold and a frame loss tolerance for a route convergence test. The route convergence test is initiated by transmitting data plane traffic addressed to at least one destination to a device under test (DUT). At least one route is advertised to the DUT. A first time instance when the at least one route is advertised to the DUT is recorded. Data plane traffic routed by the DUT is monitored. It is detected when data plane traffic for the at least one route reaches the route convergence threshold. In response to detecting that the data plane traffic reaches the route convergence threshold, a second time instance is recorded and a route convergence validation test phase is initiated. During the route convergence validation test phase, an indication of frame loss for the at least one route is determined and an indication of validity or invalidity of the route convergence test is generated based on a relationship between the indication of frame loss and the frame loss tolerance.

21 Claims, 8 Drawing Sheets (56) References Cited

U.S. PATENT DOCUMENTS

2011/0149721 A1* 6/2011 Yang ................... H04L 41/0654
370/216
2013/0265881 A1* 10/2013 Filsfils .................... H04L 43/04
370/241

OTHER PUBLICATIONS

Imhoff et al. RFC 6413. Benchmarking Methodology for Link-State IGP Data-Plane Route Convergence. (Year: 2011).*
Papneja et al., "Basic BGP Convergence Benchmarking Methodology for Data-Plane Convergence," RFC 7747, pp. 1-35 (Apr. 2016).
"BGP Testing—IxANVL, IxExplorer, IxAutomate/IxScriptmate," Ixia Test Plan, www.ixiacom.com, pp. 1-20 (2004).
Rekhter et al., "A Border Gateway Protocol 4 (BGP-4)," RFC 1771, pp. 1-57 (Mar. 1995).
"Border Gateway Protocol (BGP) Conformance and Performance Testing," Ixia White Paper, www.ixiacom.com, pp. 1-34 (2004).

* cited by examiner

METHODS, SYSTEMS, AND COMPUTER READABLE MEDIA FOR CONDUCTING AND VALIDATING NETWORK ROUTE CONVERGENCE TESTING

RELATED APPLICATIONS

This application claims the benefit of Romanian Patent Application No. a 2017 00418, filed Jun. 23, 2017; the disclosure of which is incorporated herein by reference in its entirety.

TECHNICAL FIELD

The subject matter described herein relates to testing route convergence in a network. More particularly, the subject matter described herein relates to methods, systems, and computer readable media for conducting and validating network route convergence testing.

BACKGROUND

In testing data network elements, such as network routers and switches, it is desirable to determine the time that it take a network router or switch to install a new routing or forwarding table entry and to start forwarding traffic using the newly installed entry. The protocol used to distribute routing information among autonomous systems in Internet protocol networks is called border gateway protocol (BGP). The routing data structure populated using routing information distributed using BGP is called the routing information base (RIB). Testing the time it takes a router to install and begin using an advertised route is referred to as RIB-in convergence testing and is defined in IETF RFC 7747, the disclosure of which is incorporated herein by reference in its entirety.

When performing route convergence testing, such as RIB-in convergence testing, route convergence times can vary depending on how switches and routers buffer traffic during a convergence event. Such buffering can skew test results, since delivery of buffered traffic is delayed and subsequently delivered in a burst. Delivering traffic in a burst can cause the route to appear to be converged, even though some of the transmitted traffic is still not being forwarded to the receive ports. IETF 7747 RIB-in convergence testing does not account for variations in packet transmission rates caused by burst transmissions during convergence testing.

Another problem with route convergence testing is that network switches and routers may be configured with thousands or millions of different routes, and route convergence test results may be reported on a per-route basis. Reporting results of convergence testing on a per-route basis for large numbers of routes can make the results difficult to interpret, especially when thousands or even millions of routes are being tested. Individual route convergence times may be less important than aggregate route convergence times when assessing the overall performance of a router.

Yet another problem associated with route convergence testing is that running multiple iterations of a test can be time and labor intensive. For example, it may be desirable to perform route convergence testing multiple times where a test iteration ends and restarts once convergence is achieved or a short time thereafter. If the test engineer is required to configure the first test iteration, run the first test iteration, wait until the first test iteration finishes, and then re-run the first test iteration, the time and labor required to perform multiple test iterations can be undesirably high.

Accordingly, there exists a need for improved methods, systems, and computer readable media for route convergence testing.

SUMMARY

A method for testing network route convergence includes receiving input for specifying a route convergence threshold and a frame loss tolerance for a route convergence test. The method further includes initiating the route convergence test by transmitting data plane traffic addressed to at least one destination to a device under test (DUT). The method further includes advertising at least one route to the DUT. The method further includes recording a first time instance when the at least one route is advertised to the DUT. The method further includes monitoring data plane traffic routed by the DUT and detecting that the data plane traffic for the at least one route reaches the route convergence threshold. The method further includes, in response to detecting that the data plane traffic reaches the route convergence threshold, recording a second time instance and initiating a route convergence validation test phase and, during the route convergence validation test phase, determining an indication of frame loss for the at least one route and generating an indication of validity or invalidity of the route convergence test based on a relationship between the indication of frame loss and the frame loss tolerance.

A system for conducting and validating network route convergence testing includes a network equipment test device. The system further includes a management module located in the network equipment test device for receiving input for specifying a route convergence threshold and a frame loss tolerance for a route convergence test. The system further includes a first port module located in the network equipment test device initiating the route convergence test by transmitting data plane traffic addressed to at least one destination to a device under test (DUT). The system further includes at least one second port module located in the network equipment test device for advertising at least one route to the DUT, recording a first time instance when the at least one route is advertised to the DUT, monitoring data plane traffic routed by the DUT and detecting that the data plane traffic for the at least one route reaches the route convergence threshold, and, in response to detecting that the data plane traffic reaches the route convergence threshold recording a second time instance and initiating a route convergence validation test phase and, during the route convergence validation test phase, determining an indication of frame loss for the at least one route and generating an indication of validity or invalidity of the route convergence test based on a relationship between the indication of frame loss and the frame loss tolerance.

The subject matter described herein for testing a network device using a variable burst profile may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
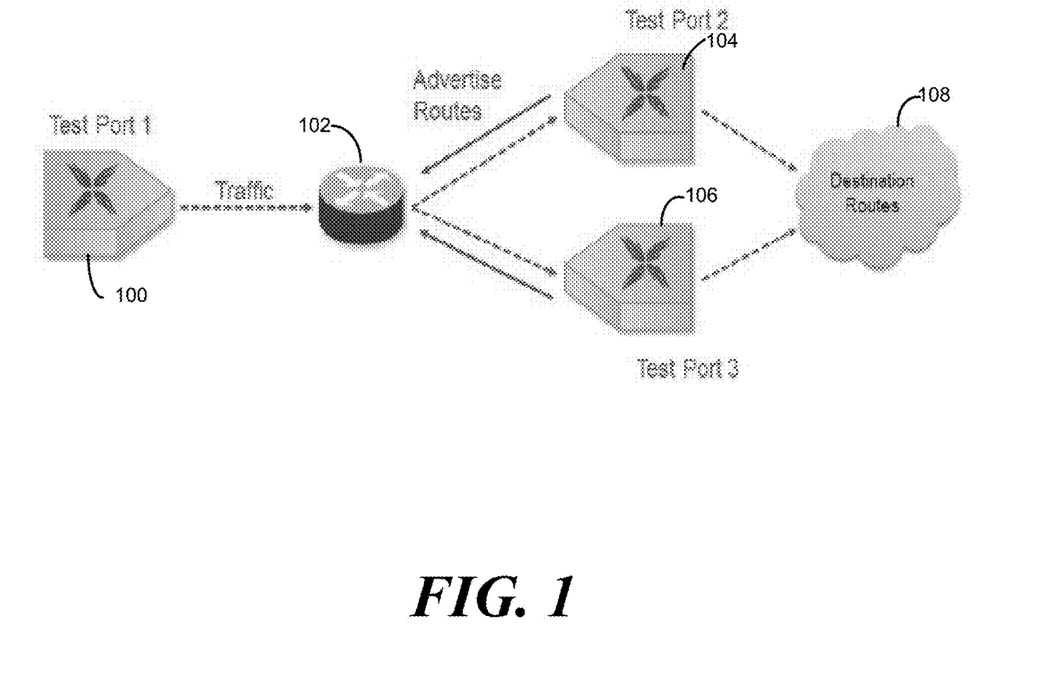
FIG. 1 is a network diagram illustrating an exemplary test setup for network route convergence testing.

The subject matter described herein relates to methods, systems and computer readable media for validating network route convergence testing. FIG. 1 is a network diagram illustrating an exemplary test setup for network route convergence testing according to an aspect of the subject matter described herein. Referring to FIG. 1, a test port 100 generates and sends data plane traffic to a device under test 102, which in the illustrated example is a router. Test ports 104 and 106 advertise routes to destinations 108. It is desirable to measure the amount of time from the transmission of routes to device under test 102 to the time that the routes are installed and traffic is being forwarded over the newly installed routes. It is also desirable to specify a frame loss tolerance to validate results of traffic convergence testing.

Figure 2:
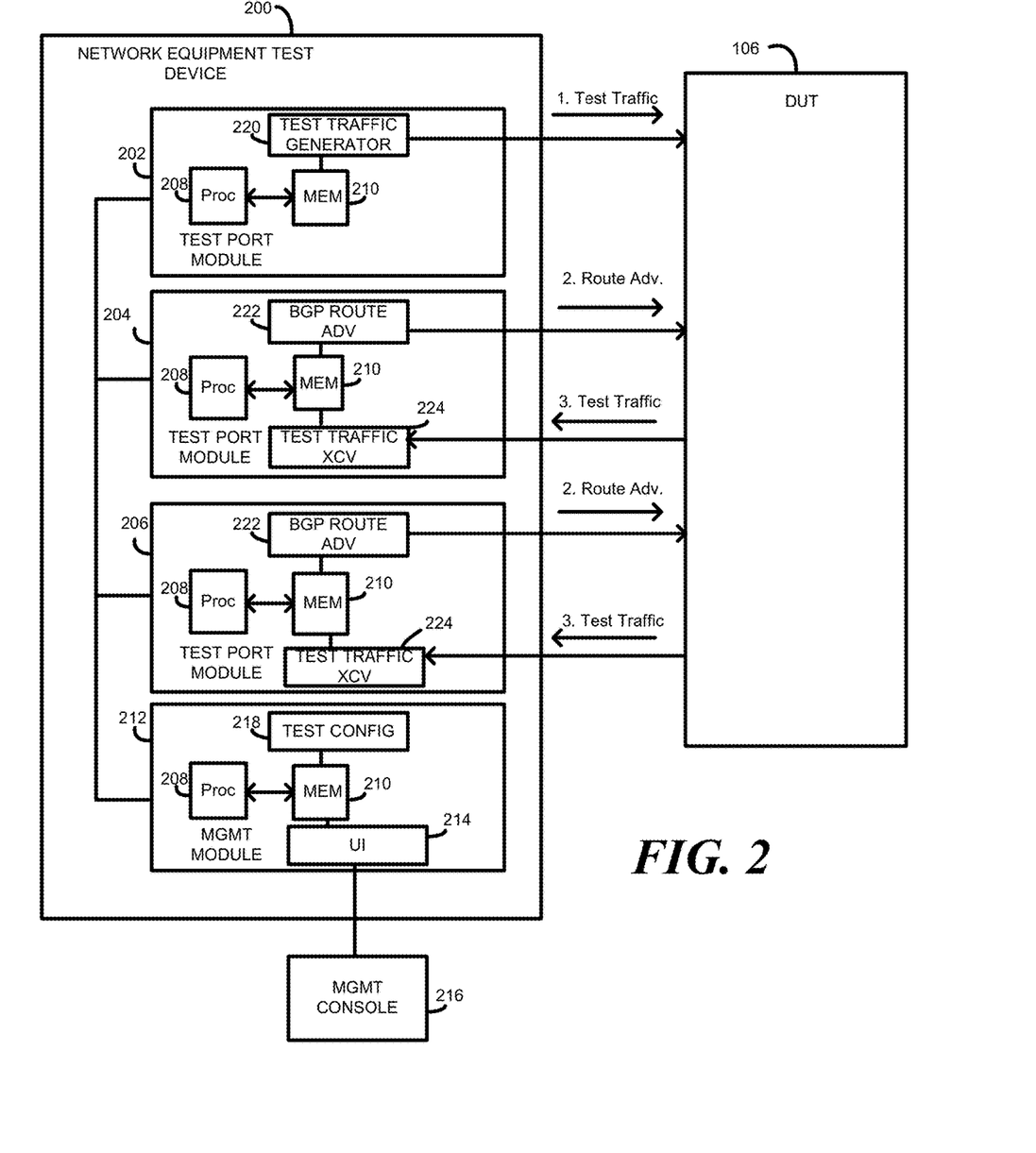
FIG. 2 is a block diagram illustrating a network equipment test device for network route convergence testing.

FIG. 2 is a block diagram of a network equipment test device for implementing the testing illustrated in FIG. 1. Referring to FIG. 2, a network equipment test device 200 includes test port modules 202, 204, and 206 that respectively connect to device under test 102 through test ports 100, 104, and 106 illustrated in FIG. 1. Each test port module 202, 204, and 206 is a printed circuit board including a processor 208 and a memory 210. A management module 212 is a printed circuit board that also includes a processor 208 and memory 210 and controls the overall configuration and operation of network equipment test device 200. For example, management module 212 may include a user interface 214, such as a graphical user interface that allows a user, through a management console 216, to create a test configuration 218 for controlling network equipment test device 200 to execute tests to test device under test 102.

A user, through management console 216, may configure network equipment test device 200 to implement route convergence testing of device under test 102, and, based on the configuration information entered by the user, management module 212 may configure port modules 202, 204, and 206 to execute the route convergence test. In the illustrated example, port module 202 is configured with a test traffic generator 220 for generating and sending data plane traffic to device under test 102. Test traffic generator 220 may be configured with source and destination IP addresses for the data plane traffic, frame sizes to use, frame rates, etc. Port modules 204 and 206 may be configured to advertise routes and monitor traffic received on the routes. Port modules 204 and 206 may also be configured with convergence thresholds and frame loss tolerances. A convergence threshold is a percentage of transmitted traffic after receipt of which a route will be considered to be converged. A frame loss tolerance is a percentage of frame loss that will be tolerated during a route convergence test for the test to be considered valid. If a measured frame loss is below the frame loss tolerance, the route convergence test results will be validated. If the measured frame loss is above the frame loss tolerance, the route convergence test results will be invalidated.

Figure 3:
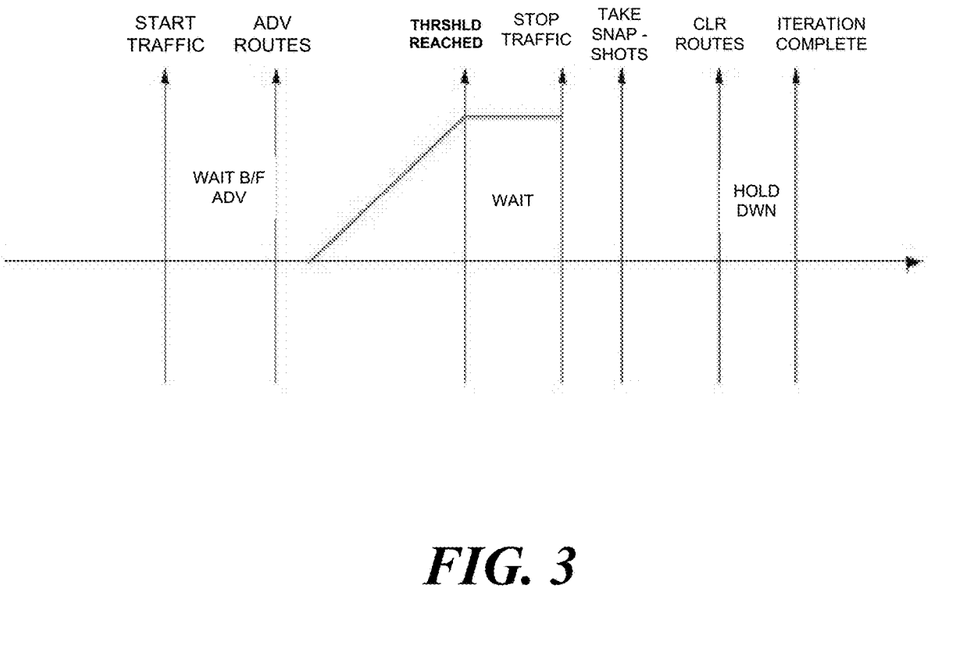
FIG. 3 is a timing diagram illustrating exemplary timing of network route convergence testing.

Once test configuration parameters are input into network equipment test device 200 the user starts the test. FIG. 3 is a timing diagram that illustrates exemplary events that may occur during a BGP RIB-in convergence test. First, network equipment test device 200 begins forwarding data plane traffic to DUT 102. In the example illustrated in FIGS. 1 and 2, the data plane traffic may be transmitted by traffic generator 220 of port module 202. The data plane traffic may be addressed to destination IP addresses of destinations for which routes have not yet been installed in DUT 102. Accordingly, DUT will initially buffer and/or drop the traffic until the corresponding routes are installed.

After a configurable time period from the start of transmission of data plane traffic, port modules 204 and 206 each advertise routes to destinations specified in the test traffic being transmitted by traffic generator 220 of port module 202. To advertise the routes, route advertisement modules 222 of each of port modules 204 and 206 may first establish transport control protocol (TCP) connections with DUT 102. Once the TCP connections are established, each of port modules 204 and 204 transmits a BGP open message to DUT 102 DUT 102 responds to each of port modules 204 and 206 with a BGP keepalive message indicating that the open message has been accepted.

Once the keepalive message has been received by each of port modules 204 and 206, port modules 204 and 206 transmit BGP update messages to DUT 102 to advertise routes to DUT 102. According to the BGP protocol as defined in IETF RFC 1771, the disclosure of which is incorporated herein by reference in its entirety, an update message can advertise at most one route to a BGP peer. Accordingly, port modules 204 and 206 may each transmit plural update messages to DUT 102, one update message for each route being advertised. The route is stored in the network reachability field of the update message.

To measure BGP RIB-in convergence time, route advertisement modules of each of port modules 204 and 206 may record the transmit time of each BGP update message advertising a route to DUT 102. In an alternate implementation, an inline device, such as a network tap, may be located between network equipment test device 200 and DUT 102 to detect and record the time of receipt of each BGP update message advertising a route to DUT 102. In either case, the transmit time of the update message from network equipment test device 200 or the receipt of an update message by an inline device may be recorded as T0, which is used as the time of receipt of the update messages by DUT 102 for purposes of calculating route convergence time, such as BGP RIB-in convergence time. The time T0 may be recorded for each advertised route.

Once the BGP route update messages have been transmitted, test traffic receivers 224 associated with test port modules 204 and 206 monitor the received traffic rate for each advertised route. When the traffic receive rate for a given route reaches the convergence rate threshold set for the route, test traffic receivers 224 record time T1 as the time of convergence for the route. For example, if the transmitted traffic rate for a route is 1000 frames per second and the convergence rate threshold is set to 95%, test traffic receivers 224 will record the convergence time T1 as the time when the traffic rate for the route reaches 950 frames per second. In a further refinement, a user may specify a sampling interval for sampling the traffic receive rate. For example, if the user specifies a sampling interval of 10 ms, the traffic receive rate for a given port will be sampled every 10 ms. If more the convergence threshold is set to 95%, and more than 9.5 packets are received in 10 ms for a given route, then the route will be considered to have reached convergence. Specifying a sampling interval for the traffic receive rate when determining whether convergence has occurred functions as a low pass filter that reduces the effect of transient spikes in the traffic receive rate on traffic receive rate measurements.

The convergence time for the route may be calculated as the difference between the time that the BGP update message advertising the route is transmitted to DUT 102 and the time that the convergence threshold is reached. Equation 1 shown below illustrates how the convergence time for each route may be calculated.

$$\text{Convergence time} = T1 - T0 \quad (1)$$

where
T1=Time that traffic reaches convergence rate threshold
T0=Transmission time of BGP update message to DUT.

Rather than ending a test iteration for a route when the convergence threshold is reached, network equipment test device 200 enters a validation phase for the route during which an indication of the frame loss rate is measured and used to validate or invalidate results of the convergence test. During the validation phase, test traffic receivers 224 measure the instantaneous transmit frame rate and the instantaneous receive frame rate for each of the routes for which convergence has been achieved. The sampling interval for sampling the transmit and receive frame rates may be set to a larger interval than the interval used to sample the receive frame rate when testing for convergence. Test traffic receivers 224 on each of test port modules 204 and 206 compute a difference between the instantaneous transmit frame rate and the instantaneous receive frame rate for each of the routes. This difference is used as an indication of frame loss. Equation 2 shown below illustrates this calculation:

$$\text{Frame loss rate} = Tx \text{ Frame Rate} - Rx \text{ frame rate} \quad (2)$$

Test traffic receivers 224 may compute the frame loss rate using Equation 2 for each route that has converged. The frame loss rate calculation may be repeated for a configurable time period after conversion and a statistical measure, such as an average frame loss rate for each route, may be computed. Test traffic receivers 224 may compare the average frame loss rate for each route with the configurable frame loss tolerance. If the frame loss rate is less than or equal to the frame loss tolerance, results of the convergence test may be validated. If the frame loss rate is greater than the frame loss tolerance, results of the convergence test may be invalidated.

Returning example test sequence in FIG. 3, after the convergence threshold is reached and the test validation phase ends, transmission of data plane traffic is stopped, and a snapshot of results is presented to the user. The snapshot may include convergence times aggregated for all of the routes, as will be described below with respect to FIG. 4. Next, the routes are cleared. Clearing of the routes may be effected by the transmission of BGP route update messages from port modules 204 and 206 to DUT 102 listing the routes to withdraw from the RIB. After the routes are withdrawn, the test iteration ends.

According to another aspect of the subject matter described herein, testing may be automated to run multiple iterations without requiring that the user manually start and stop each iteration. For example, the test iteration illustrated in FIG. 3 can be iteratively repeated a configurable number of times and convergence times and packet loss rates may be recorded for the different iterations. Statistics can be collected and presented for the multiple iterations. For example, average convergence time and average frame loss can be presented for the iterations.

In yet another example, each test iteration may be controlled based on the frame loss rate. For example the route convergence test for a route may be started by transmitting traffic to the DUT over the route. Once the convergence rate threshold is reached for the route, the flow of traffic may be continued until the measured frame loss rate is below the frame loss tolerance. For example, if the transmit frame rate for a give test iteration is 1000 frame per second and the convergence threshold is 95%, the convergence time may be recorded when the receive frame rate for a route being monitored for the test reaches 950 frames per second. If the frame loss tolerance is 5%, the test may be continued until the instantaneous rate differential between the transmitted and received frame rates for that route is at or below 50 frames per second.

Figure 4:
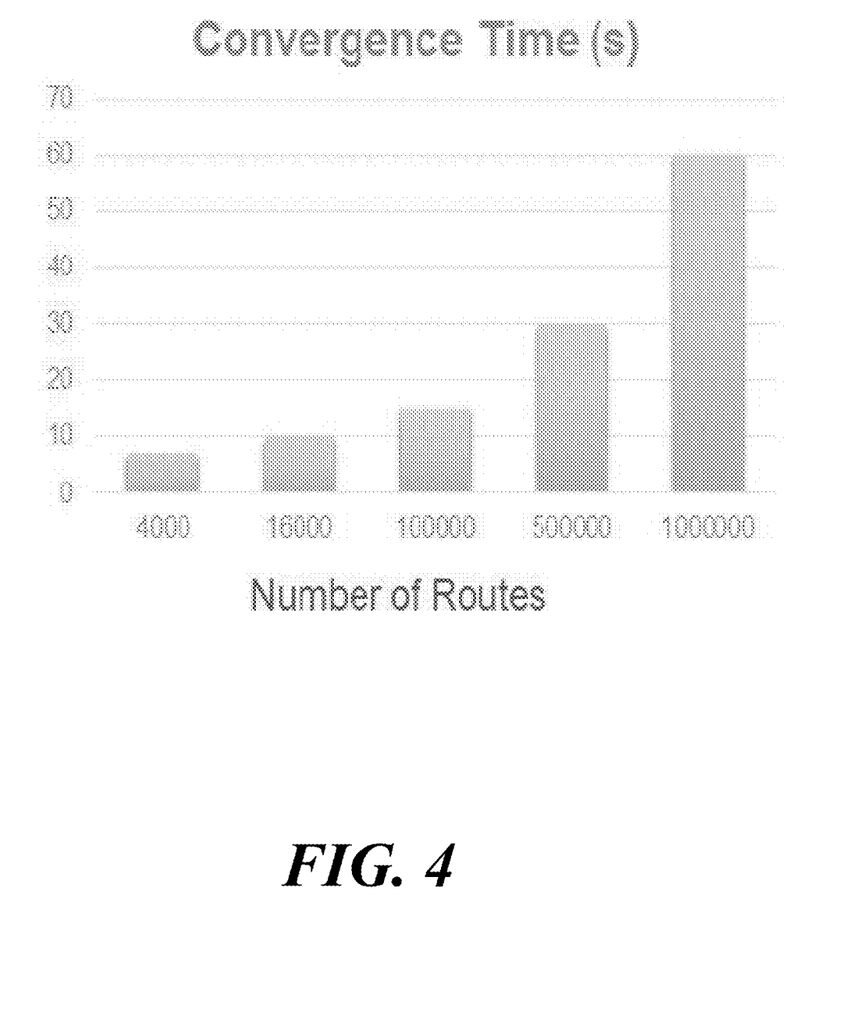
FIG. 4 is a graph illustrating exemplary aggregate reporting of results from network route convergence testing.

According to yet another aspect of the subject matter described herein, rather than or in addition to reporting convergence times on a per-route basis, network equipment test device 200 may report route convergence times on an aggregate basis across all of the routes for a particular iteration of the convergence test. FIG. 4 is a graph illustrating exemplary aggregated convergence test results that may be generated by network equipment test device 200. Referring to FIG. 4, route convergence times for different numbers of routes are displayed. The horizontal axis contains different numbers of routes tested in different route iterations and the vertical axis illustrates convergence times in seconds. The route convergence times may be the average route convergence times for each given number of routes. For example, for 4000 routes, the convergence time of about 8 s may be the average convergence time of the convergence measured for a 4000 route test iteration. As expected, the route convergence time increases with the number of routes, indicating that BGP RIB-IN resources are shared among routes in network router implementations.

Figure 5:
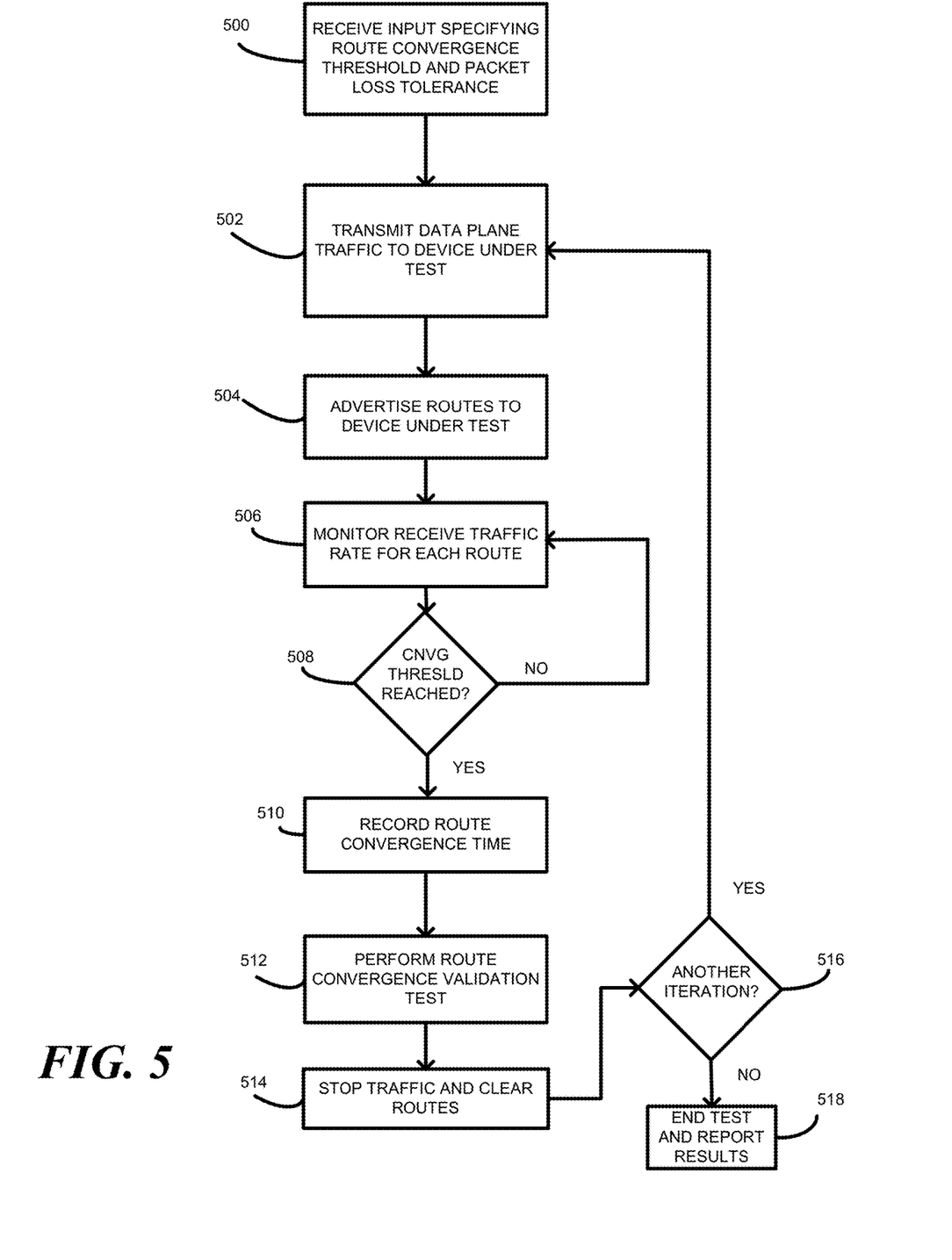
FIG. 5 is a flow chart illustrating and exemplary process for network route convergence testing.
Figure 6A:
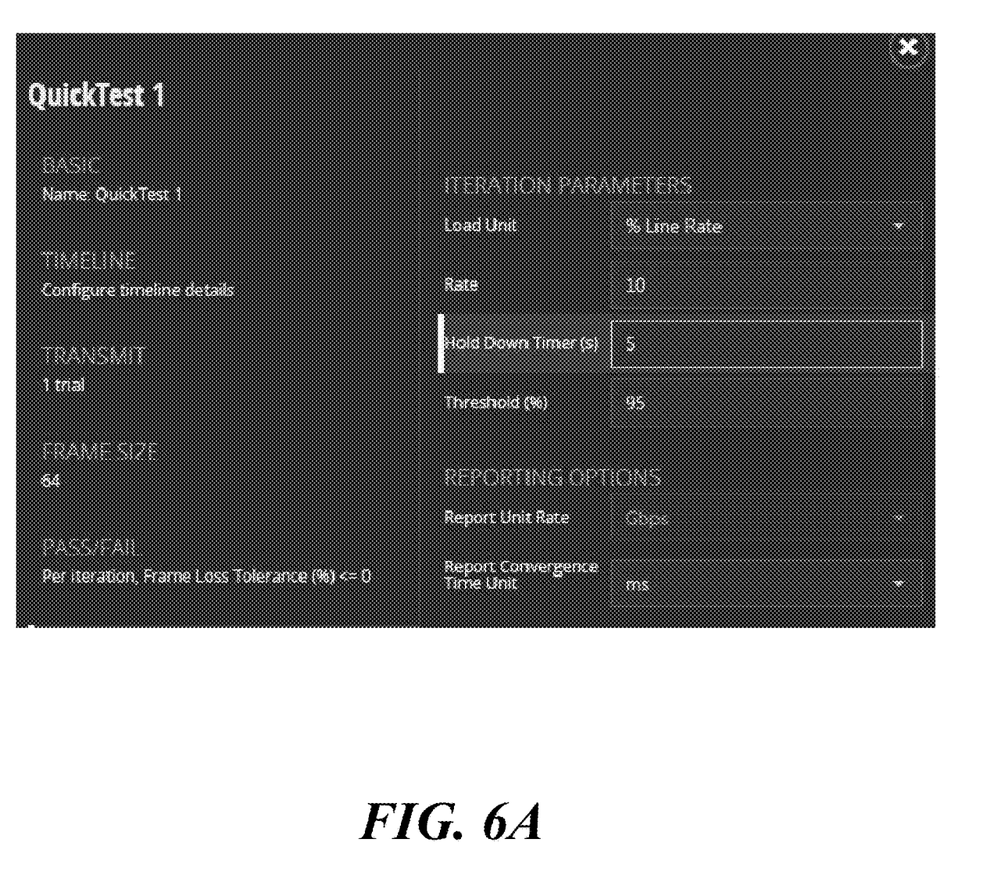
FIGS. 6A and 6B are computer screen shots illustrating an exemplary user interface for setting a route convergence threshold and a frame loss tolerance for a route convergence test.

FIG. 5 is a flow chart illustrating exemplary overall operation of network equipment test device 200 in performing RIB-in convergence testing with frame loss tolerance validation. Referring to FIG. 5, in step 500, input for specifying a route convergence threshold and a frame loss tolerance for a route convergence test; is received. FIG. 6A illustrates an exemplary graphical user interface that may be provided by network equipment test device 200 for setting the frame loss tolerance. In FIG. 6A, the user interface element labeled "Threshold (%)" includes a dialog box for receiving user input of a percentage of a transmitted traffic rate that will trigger the recording of the convergence time. In the illustrated example, the line rate is 10 Gbps. The transmit rate has not yet been specified, as the dialog box labeled "Load Unit" allows the user to specify a transmission rate as a percentage of line rate. If the user selects 100% for the load unit, the transmission rate will be 10 Gbps. The convergence threshold is set by the user to be 95%. Assuming that the user selects 100% for the Load Unit parameter, the convergence time will be recorded when the receive traffic fate on the port being monitored is at 95% of the transmit rate or 9.5 Gbps.

Figure 6B:
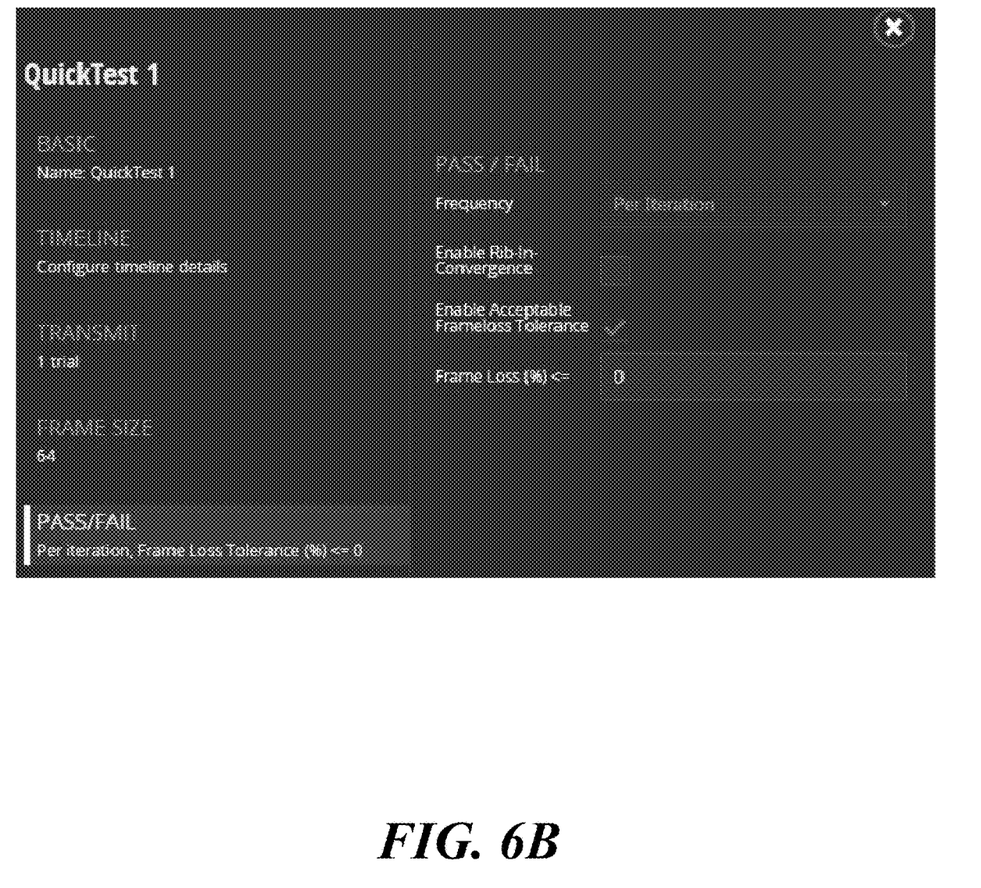

FIG. 6B illustrates an exemplary user interface that may be presented by network equipment test device 200 for allowing the user to enable and specify the frame loss tolerance. In FIG. 6B, the dialog box labeled "Enable Acceptable Frame Loss Tolerance" allows the user to enable frame loss tolerance checking for the RIB-in convergence test. The dialog box labeled "Frame Loss (%)<=" allows the user to specify a frame loss tolerance for the validation phase of RIB-in convergence test. In the illustrated example, 0% is specified, meaning that the route convergence test will fail if the frame loss (measured by the difference in transmit and receive traffic rates) is greater than 0%.

Other parameters of interest in FIGS. 6A and 6B include Frame Size, which allows the user to specify a frame size for the iteration, Enable RIB-in Convergence, which allows the user to enable a RIB-in convergence test, and Transmit, which allows the user to set a number of iterations of the RIB-in convergence test to run automatically.

Returning to FIG. 5, in step 502, a route convergence test, such as a BGP RIB-in convergence test, is initiated by transmitting data plane traffic addressed to at least one destination to a device under test (DUT). For example, test traffic generator 220 of network equipment test device 200 may transmit IP packets encapsulated in Ethernet frames to a network router or other DUT. The IP packets may be addressed to destination IP addresses for which the DUT does not have configured routes. Accordingly, the DUT may initially buffer the packets.

In step 504, at least one route is advertised to the DUT. For example, BGP route advertisement modules 222 of network equipment test device 200 may send BGP update messages to the DUT to advertise one or more routes to the DUT.

In step 506, a first time instance when the at least one route is transmitted to the DUT is recorded. For example, BGP route advertisement modules 222 may record a transmit timestamp for the time that the update message is sent to the DUT. Alternatively, an in-line device located between network equipment test device 200 and the DUT may intercept the update packet, record the time of interception, and allow the update packet to proceed to the DUT.

In step 508, data plane traffic routed by the DUT is monitored, and it is determined that the data plane traffic for the at least one route reaches the route convergence threshold. For example, test traffic receivers 224 may monitor incoming data plane traffic from the DUT and continually or periodically calculate the traffic receive rate on a per route basis and determine whether the rate is equal to the convergence threshold. Using the example about from FIGS. 6A and 6B, if the transmit data rate is 10 Gbps and the convergence threshold is 95%, test traffic receivers 224 may determine that a route has converged with the receive traffic rate for a particular route reaches 9.5 Gbps.

In step 510, in response to determining that the data plane traffic reaches the route convergence threshold, a second a second time instance is recorded. For example, when the route convergence threshold for a particular route is reached, test traffic receivers 224 may record the time that the threshold as reached as the convergence time for the route.

In step 512, a route convergence validation test is performed. During the route convergence validation test, an indication of frame loss is measured for the at least one route. In one example, test traffic receivers 224 may compute the frame loss rate as the difference between a transmitted frame rate, packet rate, bit rate, or other metric and a received frame rate, packet rate, bit rate, or other metric for a route. The terms "transmitted traffic rate" and "receive traffic rate" are intended to refer generically to any of these metrics. Test packet receivers 224 may generate an indication of validity or invalidity of the route convergence test based on a relationship between the frame loss rate and the frame loss tolerance. For example, test packet receivers 224 may indicate that the test iteration passed or failed based on whether or not the measured frame loss is less than or equal to the frame loss tolerance.

Once the test iteration has passed or failed, control proceeds to step 514 where traffic is stopped, and the routes are cleared. Stopping traffic on route convergence after validation enables a test engineer to run multiple tests automatically versus running each test for a specified time period. For example, if a route convergence test iteration ends in 2 seconds, then approximately 30 iterations can be executed in one minute versus waiting for the end of a time interval to end one iteration and start a new iteration.

As stated above, clearing the route may include transmitting BGP update messages to the DUT specifying the routes to be cleared or withdrawn. This task may be performed by BGP route advertisement modules 222.

Once the test iteration ends, control proceeds to step 516 where it is determined whether another test iteration is to be performed. It may be desirable to perform multiple iterations of a route convergence test to generate statistically significant results. The number of routes, frame sizes, and other parameters can be varied in different iterations. If another test iteration is to be performed, control returns to step 502 where data plane traffic is transmitted to the DUT. If no further iterations are to be performed, control proceeds to step 518 where the test ends, and results are reported. As stated above, in one example, aggregate results, such as those illustrated in FIG. 4 may be reported. As indicated in FIG. 4, convergence time versus number of routes is one example of aggregated results that may be reported.

Figure 7:
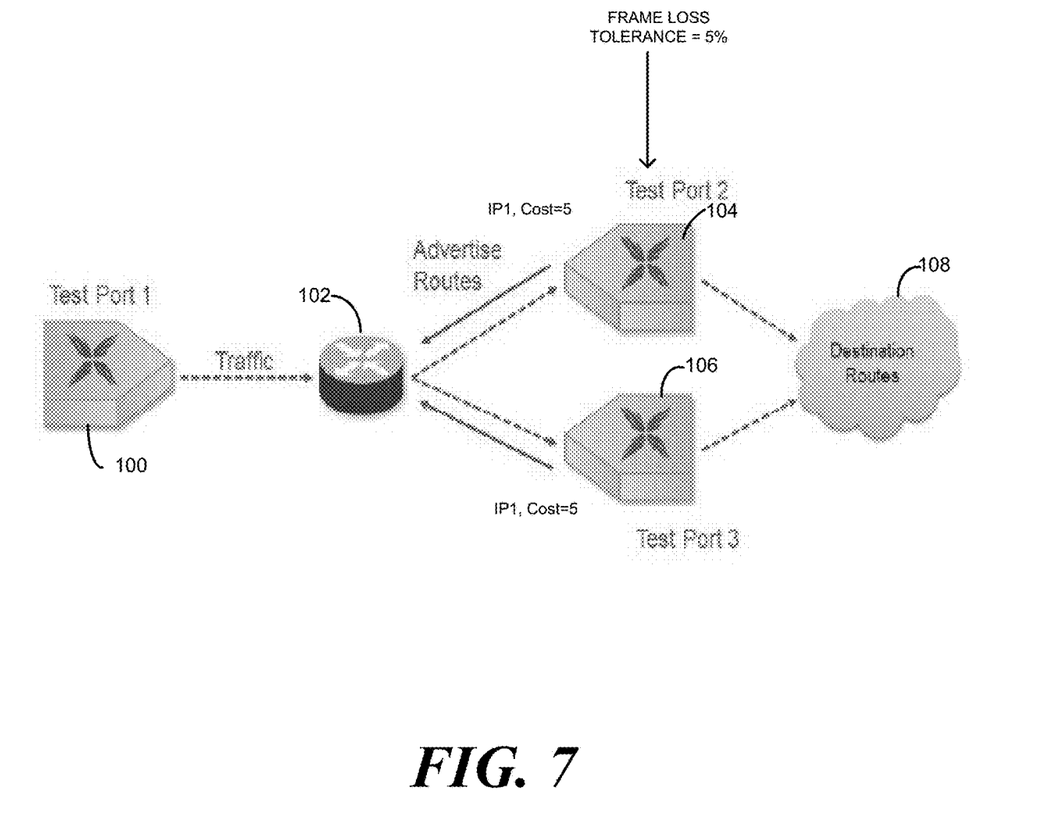
FIG. 7 is a network diagram illustrating network route convergence testing in a network where load balancing among multiple routes is performed.

According to another aspect of the subject matter described herein, network equipment test device 200 is configured to support RIB-in convergence testing with a frame loss tolerance for equal cost routes to the same destination. This scenario is illustrated in FIG. 7. In FIG. 7, ports 104 and 106 advertise equal cost routes to a destination IP address IP1. This means that during a test, DUT 102 will load share packets addressed to destination A among ports 104 and 106 using a load sharing algorithm, such as round robin load sharing.

In the example illustrated in FIG. 7, it is assumed that the user has specified a convergence threshold of 90% and a frame loss tolerance of 5%. Since the traffic is split equally between ports 104 and 106 the convergence threshold may be reached when the total received data rate on ports 104 and 106 reaches 90% of the transmit data rate. Thus, if the transmit data rate is 10 Gbps, the route will be considered to be converged when the total data rated received by ports 104 and 106 is 9 Gbps. Similarly, the frame loss may be computed by computing the difference between the transmit data rate and the sum of the receive data rates on ports 104 and 106. That is, the frame loss threshold for a route shared across multiple ports may be calculated as follows:

$$FL(total) = \Sigma_{i=1}^{N} FL(PortN) \quad (3)$$

In Equation 3, FL(total) is the total frame loss measured for a route that is load shared across multiple ports. FL(PortN) is the frame loss on an individual port, port N. FL(PortN) can be computed as follows:

$$FL(PortN) = Tx(PortN) - Rx(PortN) \quad (4)$$

$$= \frac{Tx(\text{Total})}{numports} - Rx(PortN)$$

In Equation 4, FL(Port N) is the frame loss on port N, Tx(Port N) is the transmit rate for port N, numports is the total number of ports in the route, and Rx(PortN) is the receive data rate measured for Port N. Thus, using Equation 3, network equipment test device 200 can compute the frame loss for each port over which a route is load shared. The results from applying Equation 4 to each port can be summed using Equation 3. The total frame loss from Equation 3 can be compared to the frame loss tolerance to determine whether the convergence test passes or fails. Thus, network equipment test device 200 described herein performs route convergence testing with frame loss tolerance for routes that are load balanced among ports by the router.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for conducting and validating network route convergence testing, the method comprising:
    at a network equipment test device:
        receiving input for specifying a route convergence threshold and a frame loss tolerance for a route convergence test;
        initiating the route convergence test by transmitting data plane traffic addressed to at least one destination to a device under test (DUT);
        advertising at least one route to the DUT;
        recording a first time instance when the at least one route is advertised to the DUT;
        monitoring data plane traffic routed by the DUT and detecting that the data plane traffic for the at least one route reaches the route convergence threshold; and
        in response to detecting that the data plane traffic reaches the route convergence threshold:
            recording a second time instance; and
            initiating a route convergence validation test phase and, during the route convergence validation test phase, determining an indication of frame loss for the at least one route and generating an indication of validity or invalidity of the route convergence test based on a relationship between the indication of frame loss and the frame loss tolerance;
        wherein receiving input specifying a route convergence threshold includes receiving input indicating a percentage of a traffic transmission rate to trigger recording of the first time instance and initiation of the route convergence validation test phase.

2. A method for conducting and validating network route convergence testing, the method comprising:
    at a network equipment test device:
        receiving input for specifying a route convergence threshold and a frame loss tolerance for a route convergence test, wherein receiving input specifying a frame loss tolerance includes receiving input regarding a percentage of frame loss that can be tolerated and above which results of the route convergence test will be invalidated;
        initiating the route convergence test by transmitting data plane traffic addressed to at least one destination to a device under test (DUT);
        advertising at least one route to the DUT;
        recording a first time instance when the at least one route is advertised to the DUT;
        monitoring data plane traffic routed by the DUT and detecting that the data plane traffic for the at least one route reaches the route convergence threshold; and
        in response to detecting that the data plane traffic reaches the route convergence threshold:
            recording a second time instance; and
            initiating a route convergence validation test phase and, during the route convergence validation test phase, determining an indication of frame loss for the at least one route and generating an indication of validity or invalidity of the route convergence test based on a relationship between the indication of frame loss and the frame loss tolerance.

3. The method of claim 1 wherein initiating a route convergence test includes initiating a border gateway protocol (BGP) routing information base-in (RIB)-in convergence test.

4. The method of claim 1 wherein transmitting the data plane traffic to the DUT includes transmitting data frames addressed to a destination specified by the at least one route to the DUT.

5. The method of claim 3 wherein advertising the at least one route to the DUT includes transmitting a border gateway protocol (BGP) route update message to the DUT.

6. The method of claim 1 comprising computing a route convergence time as a difference between the first and second time instances and reporting an aggregate route convergence time for the DUT.

7. The method of claim 1 wherein determining the indication of frame loss includes computing a difference between a frame transmission rate and a frame receive rate for the at least one route.

8. The method of claim 1 comprising outputting the indication of invalidity of the route convergence test in response to the indication of frame loss exceeding the frame loss tolerance.

9. The method of claim 1 comprising automatically restarting the route convergence test upon termination of the route convergence validation test phase.

10. The method of claim 1 wherein advertising the routes includes advertising plural routes on different ports to the same destination, detecting that the data plane traffic reaches the routing convergence threshold includes determining that a sum of receive traffic rates on the different ports reaches convergence threshold, and determining an indication of frame loss includes summing frame loss rates from the different ports.

11. A system for conducting and validating network route convergence testing, the system comprising:
    a network equipment test device;

a management module located in the network equipment test device for receiving input for specifying a route convergence threshold and a frame loss tolerance for a route convergence test;

a first port module located in the network equipment test device initiating the route convergence test by transmitting data plane traffic addressed to at least one destination to a device under test (DUT);

at least one second port module located in the network equipment test device for advertising at least one route to the DUT, recording a first time instance when the at least one route is advertised to the DUT, monitoring data plane traffic routed by the DUT and detecting that the data plane traffic for the at least one route reaches the route convergence threshold, and, in response to detecting that the data plane traffic reaches the route convergence threshold:

recording a second time instance; and initiating a route convergence validation test phase and, during the route convergence validation test phase, determining an indication of frame loss for the at least one route and generating an indication of validity or invalidity of the route convergence test based on a relationship between the indication of frame loss and the frame loss tolerance;

wherein receiving input for specifying a route convergence threshold includes receiving input indicating a percentage of a traffic transmission rate to trigger recording of the first time instance and initiation of the route convergence validation test phase.

12. A system for conducting and validating network route convergence testing, the system comprising:

a network equipment test device;

a management module located in the network equipment test device for receiving input for specifying a route convergence threshold and a frame loss tolerance for a route convergence test, wherein the input for specifying a frame loss tolerance includes input regarding a percentage of frame loss that can be tolerated and above which results of the route convergence test will be invalidated;

a first port module located in the network equipment test device initiating the route convergence test by transmitting data plane traffic addressed to at least one destination to a device under test (DUT);

at least one second port module located in the network equipment test device for advertising at least one route to the DUT, recording a first time instance when the at least one route is advertised to the DUT, monitoring data plane traffic routed by the DUT and detecting that the data plane traffic for the at least one route reaches the route convergence threshold, and, in response to detecting that the data plane traffic reaches the route convergence threshold;

recording a second time instance; and initiating a route convergence validation test phase and, during the route convergence validation test phase, determining an indication of frame loss for the at least one route and generating an indication of validity or invalidity of the route convergence test based on a relationship between the indication of frame loss and the frame loss tolerance.

13. The system of claim 11 wherein the route convergence test includes a border gateway protocol (BGP) routing information base-in (RIB)-in convergence test.

14. The system of claim 11 wherein the data plane traffic includes data frames addressed to a destination specified by the at least one route to the DUT.

15. The system of claim 14 wherein the at least one second port module is configured to advertise the at least one route to the DUT using a border gateway protocol (BGP) route update message to the DUT.

16. The system of claim 11 wherein the network equipment test device is configured to compute a route convergence time as a difference between the first and second time instances and report an aggregate route convergence time for the DUT.

17. The system of claim 11 wherein the indication of frame loss comprises a difference between a frame transmission rate and a frame receive rate for the at least one route.

18. The system of claim 11 wherein the network equipment test device is configured to output the indication of invalidity of the route convergence test in response to the indication of frame loss exceeding the frame loss tolerance.

19. The system of claim 11 wherein the network equipment test device is configured to automatically restart the route convergence test upon termination of the route convergence validation test phase.

20. The system of claim 11 wherein the network equipment test device is configured to advertise plural routes on different ports to the same destination, determine that a sum of receive traffic rates on the different ports reaches convergence threshold, and determine an indication of frame loss includes summing frame loss rates from the different ports.

21. A non-transitory computer readable medium having stored thereon executable instructions that when executed by the processor of a computer control the computer to perform steps comprising:

at a network equipment test device:

receiving input for specifying a route convergence threshold and a frame loss tolerance for a route convergence test;

initiating the route convergence test by transmitting data plane traffic addressed to at least one destination to a device under test (DUT);

advertising at least one route to the DUT;

recording a first time instance when the at least one route is transmitted to the DUT;

monitoring data plane traffic routed by the DUT and detecting that the data plane traffic for the at least one route reaches the route convergence threshold; and in response to detecting that the data plane traffic reaches the route convergence threshold:

recording a second time instance; and initiating a route convergence validation test phase and, during the route convergence validation test phase, determining an indication of frame loss for the at least one route and generating an indication of validity or invalidity of the route convergence test based on a relationship between the indication of frame loss and the frame loss tolerance;

wherein receiving input specifying a route convergence threshold includes receiving input indicating a percentage of a traffic transmission rate to trigger recording of the first time instance and initiation of the route convergence validation test phase.

* * * * *